United States Patent Office 2,836,612
Patented May 27, 1958

2,836,612

O-ARYL O-METHYL PHOSPHOROAMIDO-THIOATES

Kenneth C. Kauer and Edgar C. Britton, Midland, Mich., assignors to The Dow Chemical Company, Midland, Mich., a corporation of Delaware No Drawing. Application April 2, 1956
Serial No. 580,427

6 Claims. (Cl. 260—461)

The present invention is concerned with novel O-aryl O-methyl phosphoroamidothioates of the following formula

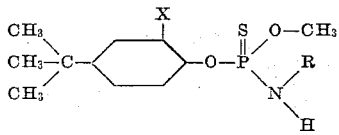

In this and succeeding formulae, X represents chlorine or bromine and R represents hydrogen, methy or ethyl. These compounds are viscous liquids which are somewhat soluble in many organic solvents and of very low solubility in water. They are useful as preservatives for paper, paint and wood and as parasiticides for the control of bacteria, fungi, mites and insects such as bean aphids, Mexican bean bettles, Southern army worms and flies.

The new compounds may be prepared by reacting in O-aryl O-methyl phosphorochloridothioate of the formula

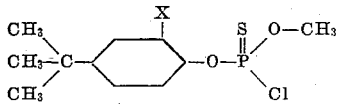

with ammonia, methylamine or ethylamine. The reaction is exothermic and takes place smoothly at the temperature range of from —10° to 30° C. with the formation of the desired product and ammonium hydrochloride or amine hydrochloride of reaction. The temperature may be controlled by regulating the rate of contacting the reactants and by external cooling as may be required. The reaction is carried out in the presence of a solvent such as acetone, methyl ethyl ketone, carbon tetrachloride or benzene. In a preferred operation, the reaction is carried out with aqueous ammonia or aqueous amine and in a water miscible solvent. Good results are obtained when at least two molecular proportions of ammonia or amine is reacted with each molecular proportion of the phosphorochloridothioate reagent.

In carrying out the reaction, gaseous ammonia or alkyl amine is contacted with the O-aryl O-methyl phosphorochloridothioate at a temperature of from —10° to 30° C. This operation is carried out in the presence of one or more of the aforementioned solvents. In an alternative procedure, an aqueous solution of ammonia or alkyl amine is mixed and blended with the phosphorochloridothioate reagent dispersed in a solvent such as acetone. Following the reaction, the reaction mixture is washed with water to separate water soluble salts and solvent and obtain the desired product as a viscous liquid.

The following examples illustrate the invention and are not to be construed as limiting.

EXAMPLE I

*O-(4-tertiarybutyl-2-chlorophenyl) O-methyl phosphoroamidothioate*

O-(4-tertiarybutyl-2-chlorophenyl) O-methyl phosphorochloridothioate (62.5 grams, 0.2 mole) was dispersed in 100 milliliters of acetone and 30 grams of a 25 percent aqueous solution of ammonia added portionwise thereto with stirring. The addition was carried out over a period of one hour and at a temperature of from 3° to 7° C. Following the reaction, the reaction mixture was diluted with 300 milliliters of water and the diluted mixture thereafter extracted with methylene chloride. The extract was then dried with sodium sulfate, filtered and the filtrate distilled under reduced pressure at temperatures gradually increasing up to a temperature of 65° C. to separate the solvent. As a result of these operations, there was obtained an O-(4-tertiarybutyl-2-chlorophenyl) O-methyl phosphoroamidothioate product as a liquid residue. This product had a density of 1.241 at 25° C., a refractive index $n/D$ of 1.5562 at 25° C. and a phosphorus content of 10.39 percent and nitrogen content of 4.73 percent. Theoretical values for phosphorus and nitrogen are 10.5 and 4.77 percent, respectively.

EXAMPLE II

*O-(4-tertiarybutyl-2-bromophenyl) O-methyl phosphoroamidothioate*

Thirty grams of 26 percent aqueous ammonia was added dropwise over a period of one hour to a mixture comprising 53.5 grams (0.15 mole) of O-(4-tertiarybutyl-2-bromophenyl) O-methyl phosphorochloridothioate dissolved in 100 milliliters of acetone. The addition was carried out with stirring and cooling in ice and at a temperature of from 3° to 7° C. Following the addition, the reaction mixture was diluted with 300 milliliters of water, the diluted mixture extracted with methylene chloride and the methylene chloride extract dried over sodium sulfate. The dried extract was then filtered and the filtrate concentrated by distillation under reduced pressure at temperatures gradually increasing up to a temperature of 120° C. As a result of these operations there was obtained an O-(4-tertiarybutyl-2-bromophenyl) O-methyl phosphoroamidothioate product as an oily residue. This product had a specific gravity of 1.3976 at 25° C. and a refractive index $n/D$ of 1.5708 at 25° C.

EXAMPLE III

*O-(4-tertiarybutyl-2-chlorophenyl) O-methyl N-methyl phosphoroamidothioate*

O-(4-tertiarybutyl-2-chlorophenyl) O-methyl phosphorochloridothioate (40 grams, 0.128 mole) was dissolved in 200 milliliters of benzene and a 25 percent aqueous solution of methylamine (eight grams, 0.256 mole of methylamine) added portionwise thereto with stirring. The addition was carried out with cooling and at a temperature of from 10° to 20° C. Stirring was continued for one half hour following the addition and the reaction mixture thereafter washed with water. The solvent was then separated from the washed mixture by evaporation and the residue thereafter concentrated by distillation under reduced pressure at gradually increasing temperatures up to a pot temperature of 80° C. As a result of these operations there was obtained an O-(4-tertiarybutyl-2-chlorophenyl) O-methyl N-methyl phosphoroamidothioate product as an oily residue. This product had a density of 1.1953 at 25° C. and a refractive index $n/D$ of 1.5468 at 25° C.

EXAMPLE IV

*O-(4-tertiarybutyl-2-bromophenyl) O-methyl N-ethyl phosphoroamidothioate*

A 25 percent aqueous solution of ethylamine (13.5 grams, 0.3 mole of ethylamine) was added portionwise with stirring and cooling to 54 grams (0.15 mole) of O-(4-tertiarybutyl-2-bromophenyl) O-methyl phosphorochloridothioate dispersed in 200 milliliters of benzene.

The addition was carried out over a period of one hour and at a temperature of from 5° to 15° C. Following the addition the reaction mixture was washed with water and thereafter dried with sodium sulfate. The dried mixture was then distilled under reduced pressure at gradually increasing temperatures up to a pot temperature of 67° C. to obtain an O-(4-tertiarybutyl-2-bromophenyl) O-methyl N-ethyl phosphoroamidothioate product as an oily residue. This product had a density of 1.2782 at 25° C. and a refractive index $n/D$ of 1.5479 at 25° C.

EXAMPLE V

*O-(4-tertiarybutyl-2-chlorophenyl) O-methyl N-ethyl phosphoroamidothioate*

A 25 percent aqueous solution of ethylamine (13.5 grams, 0.3 mole of ethylamine) was added portionwise with stirring and cooling to 47 grams (0.15 mole) of O-(4-tertiarybutyl-2-chlorophenyl) O-methyl phosphorochloridothioate dispersed in 200 milliliters of benzene. The addition was carried out over a period of one hour and at a temperature of from 5° to 15° C. Following the addition the reaction mixture was treated as described in Example 4 to obtain an O-(4-tertiarybutyl-2-chlorophenyl) O-methyl N-ethyl phosphoroamidothioate product as an oily liquid residue. This product had a density of 1.1602 at 25° C. and a refractive index $n/D$ of 1.5371 at 25° C.

In a similar manner O-(4-tertiarybutyl-2-bromophenyl) O-methyl N-ethyl phosphoroamidothioate may be prepared by reacting O-(4-tertiarybutyl-2-bromophenyl) O-methyl phosphorochloridothioate with ethylamine.

The new O-aryl O-methyl phosphoroamidothioate products are effective as parasiticides and are adapted to be employed for the control of household and agricultural pests. For such use the products may be dispersed on a finely divided carrier and employed as dusts. Also, the new products may be employed in oils, as constituents in water emulsion or in water dispersions. In a representative operation 100 percent controls of two-spotted spider mites and bean aphids have been obtained with aqueous compositions containing 100 parts by weight of O-(4-tertiarybutyl-2-chlorophenyl) O-methyl phosphoroamidothioate per million parts by weight of composition.

The O-aryl O-methyl phosphorochloridothioates employed as starting materials as herein described may be prepared by reacting one molecular proportion of a suitable O-aryl phosphorodichloridothioate with one molecular proportion of sodium methylate in an inert organic solvent such as benzene. In carrying out the reaction, the reactive agents and solvents are mixed together and thereafter heated for a period of time at a temperature of from 30° to 80° C. The reaction mixture is then successively washed with dilute aqueous sodium hydroxide and water and the solvent thereafter separated by evaporation to obtain the desired starting material as a liquid residue.

We claim:
1. An O-aryl O-methyl phosphoroamidothioate of the formula

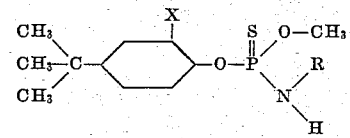

wherein X represents a member of the group consisting of chlorine and bromine and R represents a member of the group consisting of hydrogen, methyl and ethyl.

2. O-(4-tertiarybutyl-2-chlorophenyl) O-methyl phosphoroamidothioate.

3. O-(4-tertiarybutyl-2-bromophenyl) O-methyl phosphoroamidothioate.

4. O-(4-tertiarybutyl-2-chlorophenyl) O-methyl N-methyl phosphoroamidothioate.

5. O-(4-tertiarybutyl-2-bromophenyl) O-methyl N-ethyl phosphoroamidothioate.

6. O-(4-tertiarybutyl-2-chlorophenyl) O-methyl N-ethyl phosphoroamidothioate.

References Cited in the file of this patent

UNITED STATES PATENTS

| | | |
|---|---|---|
| 2,506,344 | Cleary | May 2, 1950 |

FOREIGN PATENTS

| | | |
|---|---|---|
| 814,152 | Germany | Sept. 20, 1951 |
| 246,915 | Switzerland | Nov. 1, 1947 |